(12) United States Patent
Jeong

(10) Patent No.: US 6,337,780 B1
(45) Date of Patent: *Jan. 8, 2002

(54) SERVO BURST SIGNAL RECORDING METHOD AND DISK RECORDING MEDIUM

(75) Inventor: Woo-cheol Jeong, Kumi (KR)

(73) Assignee: Samsung Electronics Co., Ltd., Suwon (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,569

(22) Filed: Dec. 31, 1998

(30) Foreign Application Priority Data

Dec. 31, 1997 (KR) .......................................... 97-82021

(51) Int. Cl.[7] ............................. G11B 5/596; G11B 5/09
(52) U.S. Cl. ..................................... 360/77.08; 360/48
(58) Field of Search ....................... 360/48, 75, 77.02, 360/77.08

(56) References Cited

U.S. PATENT DOCUMENTS

| | | | |
|---|---|---|---|
| 4,419,701 A | * 12/1983 | Harrison et al. | 360/77.08 |
| 4,811,135 A | 3/1989 | Janz | 360/77.08 |
| 5,469,113 A | 11/1995 | Steyaert et al. | 360/77.08 |
| 5,483,393 A | 1/1996 | Mento et al. | 360/77.08 |
| 5,576,910 A | 11/1996 | Romano et al. | 360/77.08 |
| 5,581,420 A | 12/1996 | Chainer et al. | 360/75 |
| 5,596,463 A | 1/1997 | Hashimoto | 360/104 |
| 5,602,293 A | 2/1997 | Brunnett et al. | 360/77.08 |
| 5,796,543 A | 8/1998 | Ton-That | 360/77.08 |
| 6,043,952 A | * 3/2000 | Liikanen | 360/77.08 |

* cited by examiner

Primary Examiner—Regina Y. Neal
(74) Attorney, Agent, or Firm—Robert E. Bushnell, Esq.

(57) ABSTRACT

A servo burst signal recording method using an enhanced pattern and a disk recording medium are provided. The disk recording medium having at least two servo burst regions on which servo burst signals are recorded in the diametrical direction on tracks of the disk recording medium, the servo burst regions each being divided into at least two sub-regions in a traveling direction of a head, one sub-region having the same width as that of a track, and the other sub-region having a smaller width than that of the track. The disk recording medium enables the user to obtain a servo burst signal component without having a dead zone even in the case when the width of a reading head is smaller than that of the recording head, which enhances the accuracy of the tracking control.

14 Claims, 4 Drawing Sheets

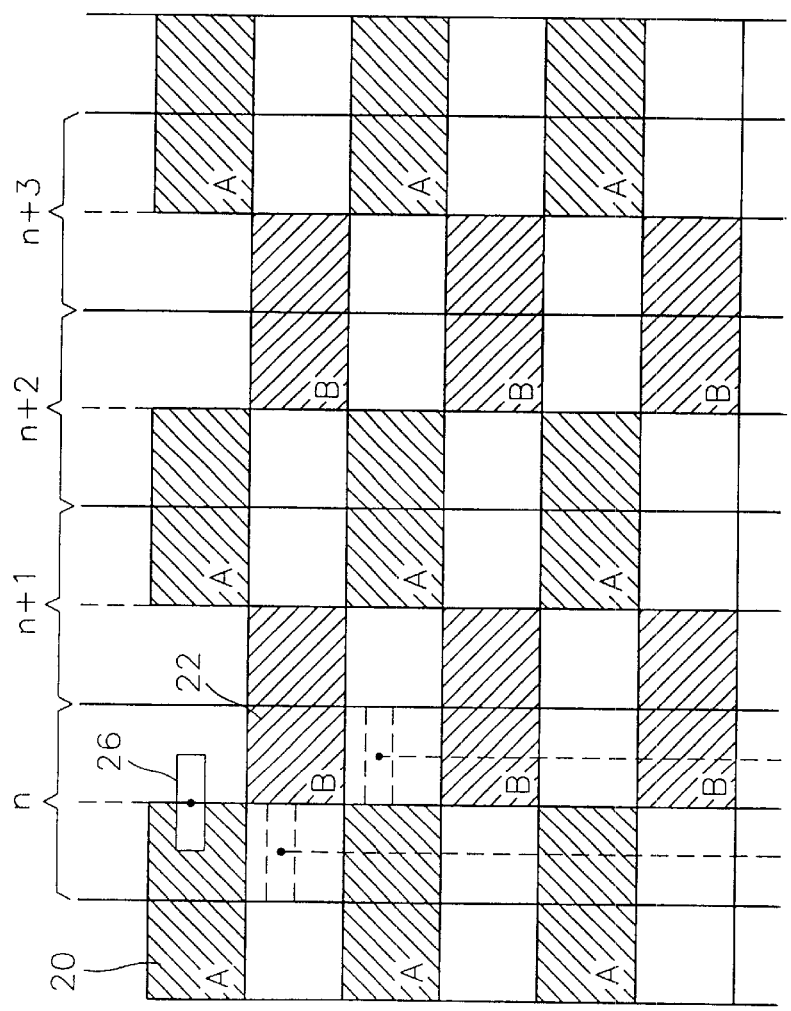
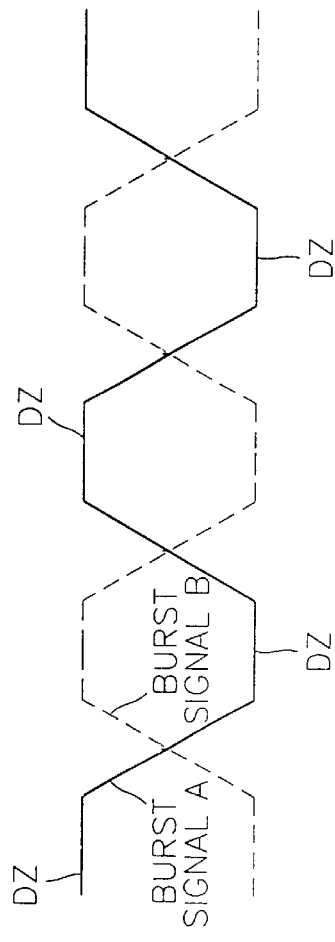
Fig. 2A *(Related Art)*
Fig. 2B *(Related Art)*

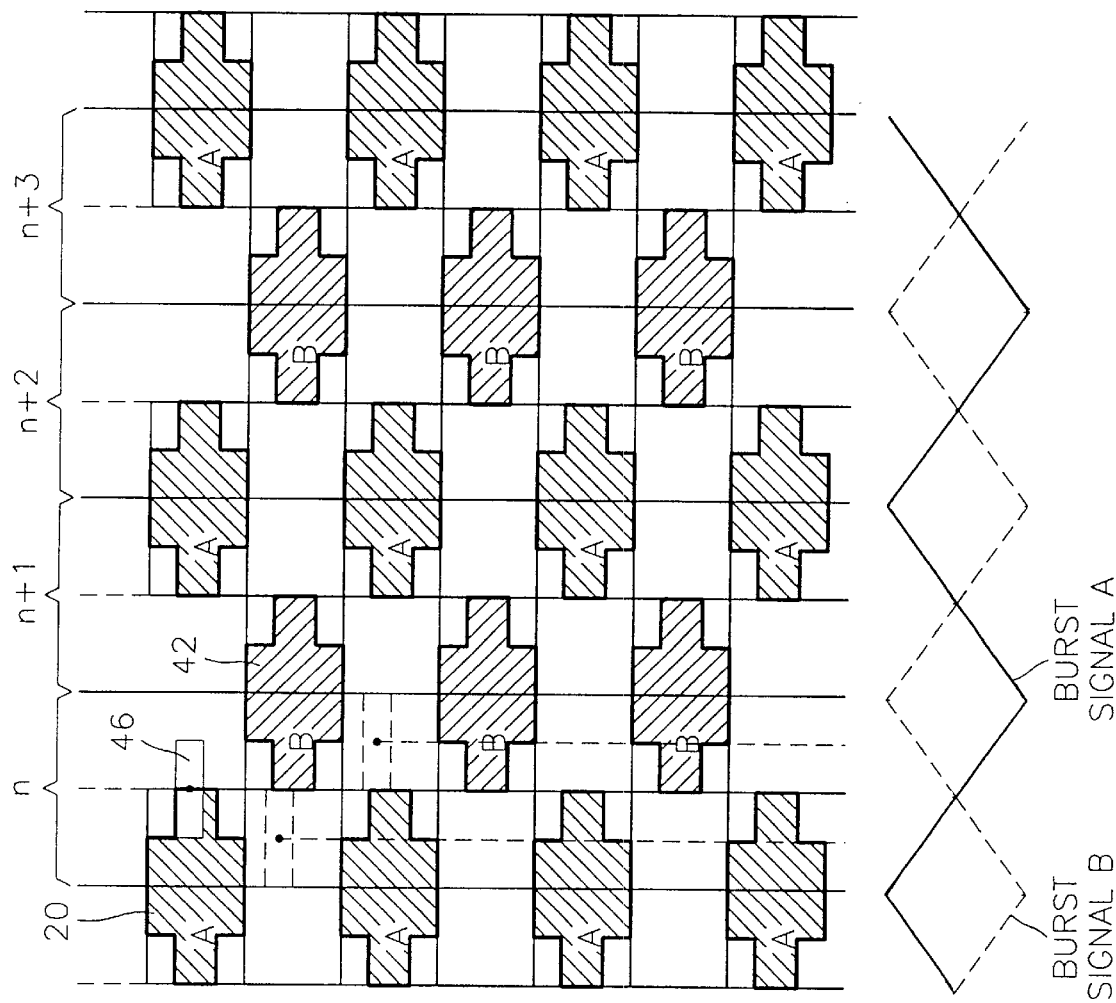

SERVO BURST SIGNAL RECORDING METHOD AND DISK RECORDING MEDIUM

CLAIM OF PRIORITY

This application makes reference to, incorporates the same herein, and claims all benefits accruing under 35 U.S.C. §119 from an application for SERVO BURST SIGNAL RECORDING METHOD AND DISK RECORDING MEDIUM earlier filed in the Korean Industrial Property Office on Dec. 31, 1997 and there duly assigned Serial No. 82021/1997.

BACKGROUND OF THE INVENTION

1. Field of the Invention

The present invention relates to a hard disk drive, and more particularly, to a servo burst signal recording method for recording a servo burst signal in an improved form, and a disk recording medium on which the servo burst signal is recorded by the servo burst signal recording method.

2. Description of the Related Art

An integrated head in which a thin-film inductive element for a recording mode combined with a magneto-resistive (MR) sensor for a reading mode has been developed in order to heighten a recording density and a recording/reproduction efficiency in a digital signal recording/reproducing apparatus such as a hard disk drive. The integrated bead includes a coil disposed between two poles and a MR sensor disposed between two shields.

An integrated recording head includes a recording element having an upper pole, a lower pole, a coil disposed between the upper and lower poles, and a reading element including an upper shield, a lower shield, and an MR sensor disposed between the upper and lower shields.

The recording element and reading element are disposed so that a predetermined distance is maintained between the coil and the MR sensor. The width W1 of the recording element is larger than the width W2 of the reading element. The reasons is because the width of the reading element does not need to be large since the sensitivity of the MR sensor is very high. The width W1 of the recording element, the width W2 of the reading element and the width of the track are defined as the diametric direction of the disk.

If an MR sensor is used, the reading characteristics of the head are not influenced by the frequency of the recording signal. However, since the width W2 of the reading element is smaller than the width W1 of the recording element, in a hard disk drive using the integrated head, a dead zone occurs during a servo operation. The dead zone is an area where the magnitude of a burst signal detected by a head does not vary within a certain range, although a track-off phenomenon occurs in which the head deviates from the center of a track.

It is important that the position of the head is controlled with respect to the center of the track on a disk, in order to ensure the accuracy of a recording/reading operation of the head in a disk drive. A sampled servo system is known as a disk drive servo system. In this system, a servo burst signal is recorded on each servo track on the disk. The servo burst signal is read by the head and is used for generating a position error signal representing a mismatch between the head and the center line of the track on the disk.

As is well-known, the servo burst signal is recorded by the recording element during a servo writing operation. The width W1 of the recording element is equal to that of the track. However, the width of the MR sensor is smaller than the width W1 of the recording element or the width W of the track in the integrated head. Thus, the occurrence of the dead zone cannot be avoided in the recording medium having the burst signal recorded thereon. As a result, the accuracy of a tracking control is lowered.

The following patents each discloses feature in common with the present invention: U.S. Pat. No. 5,796,543 to Ton-That, entitled Data Track Pattern Including Embedded Servo Sectors For Magneto-Resistive Read/Inductive Write Head Structure For A Disk Drive, U.S. Pat. No. 5,596,463 to Hashimoto, entitled Recording/Reproduction Apparatus With An Integrated Inductive Write, Magnetoresistive Read Head, U.S. Pat. No. 5,469,113 to Steyaert et al., entitled Rectifier And Integrator Circuit For Disk Drive Servo System, U.S. Pat. No. 5,483,393 to Mento et al., entitled Disk Drive Having Head Positioning Servo With Improved Servo Read Signal Processing Using Median Servo Burst Peak Magnitudes, U.S. Pat. No. 5,581,420 to Chainer et al., entitled Method And System For Determining A Radial Positioning Valve Used For Writing Tracks At A Desired Track Pitch, U.S. Pat. No. 5,576,910 to Romano et al., entitled Burst Comparison And Sequential Technique For Determining Servo Control In A Mass Storage Disk Device, U.S. Pat. No. 4,811,135 to Janz, entitled Tri-Phase Servo Pattern For Providing Information For Positioning The Transducers OF A Magnetic Disk Storage Drive, and U.S. Pat. No. 5,602,293 to Brunnett et al., entitled Method And Apparatus For Sensing Position In A Disk Drive.

SUMMARY OF THE INVENTION

To solve the above problems, it is an objective of the present invention to provide a servo burst signal recording method for more accurately a tracking control in a hard disk drive using a head having a reading element having a width smaller than that of a recording element.

It is another object of the present invention to provide a recording medium on which a servo burst signal is recorded by the above servo burst signal recording method.

To accomplish the above object of the present invention, there is provided a servo burst signal recording method for recording servo burst signals on at least two servo burst regions which are deviated in a diametrical direction in tracks of a disk recording medium, the servo burst regions each being divided into at least two sub-regions in the traveling direction of a head, one sub-region having the same width as that of a track, and the other sub-region having a smaller width than that of the track.

There is also provided a disk recording medium having at least two servo burst regions on which servo burst signals are recorded in a diametrical direction in tracks of the disk recording medium, the servo burst regions each being divided into at least two sub-regions in the traveling direction of a head, one sub-region having the same width as that of a track, and the other sub-region having a smaller width than that of the track.

It is preferable that the width of one sub-region is made smaller than that of a reading element.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2A shows a servo burst signal recorded on a recording medium;

FIG. 2B shows the position of the head and the magnitude of the burst signal detected by the head in the recording medium shown in FIG. 2A;

FIGS. 4A and 4B respectively show the position of the head and the magnitude of the burst signal in the recording medium having the servo burst signal shown in FIG. 3C.

DESCRIPTION OF THE PREFERRED EMBODIMENTS

The structure and effect of the present invention will be described with reference to the attached drawings.

Figure 1:
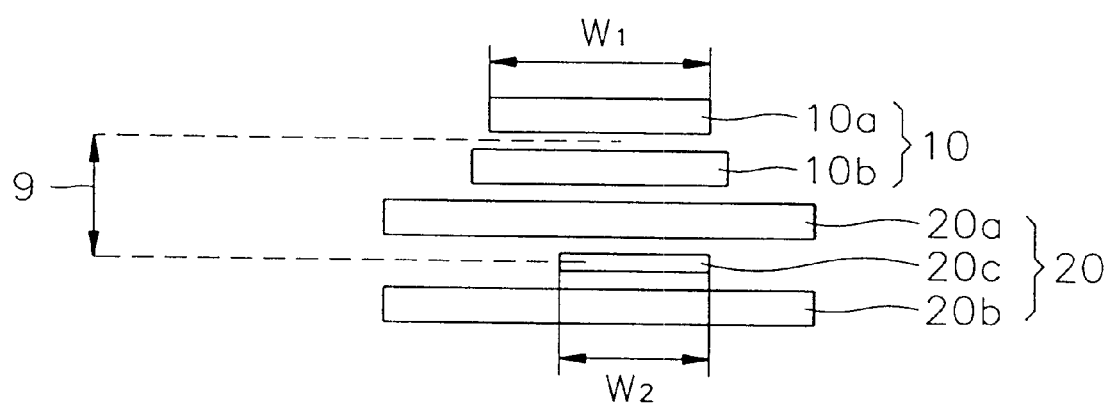
FIG. 1 shows the structure of an integrated head.

FIG. 1 shows the structure of an integrated head. As shown in FIG. 1, the integrated head includes a recording element 10 having an upper pole 10a, a lower pole 10b, a coil (not shown) disposed between the upper pole 10a and the lower pole 10b, and a reading element 20 including an upper shield 20a, a lower shield 20b and an MR sensor 20c disposed between the upper shield 20a and the lower shield 20b. The MR sensor 20c is made of an inductive ferromagnetic material of an alloy such as NiFe, and is a sensor whose resistance varies in response to a magnetic flux recorded on a disk.

The recording element 10 and the reading element 20 are disposed so that a predetermined distance 9 is maintained between the coil and the MR sensor. The width W1 of the recording element 10 is larger than the width W2 of the reading element 20. The reason is because the width of the reading element does not need to be large since the sensitivity of the MR sensor 20c is very high. The width W1 of the recording element 10, the width W2 of the reading element 20, and the width of a track are defined as the diametric direction of the disk.

If an MR sensor is used, the reading characteristics of the head are not influenced by the frequency of the recording signal, to thereby sufficiently heighten a recording density. However, since the width W2 of the reading element 20 is smaller than the width W1 of the recording element 10, in a hard disk drive using the integrated head, a dead zone occurs during a servo operation. The dead zone is an area where the magnitude of a burst signal detected by a head does not vary within a certain range, although a track-off phenomenon occurs in which the head deviates from the center of a track.

It is important that the position of the head is controlled with respect to the center of the track on a disk, in order to assure the accuracy of a recording/reading operation of the head in a disk drive. A sampled servo system is known as a disk drive servo system. In this system, a servo burst signal is recorded on each servo track on the disk. The servo burst signal is read by the head and is used for generating a position error signal representing a mismatch between the head and the center line of the track on the disk.

Figure 3A:
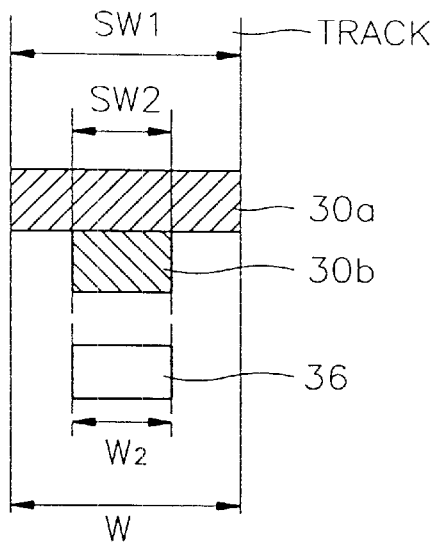
FIGS. 3A through 3C show examples of the servo burst signals recorded on a recording medium according to the present invention.
Figure 3B:
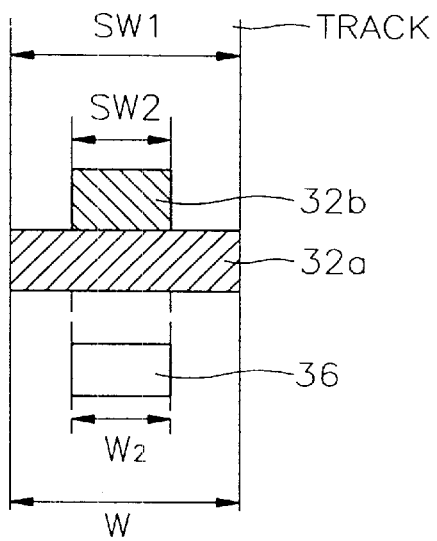
Figure 3C:
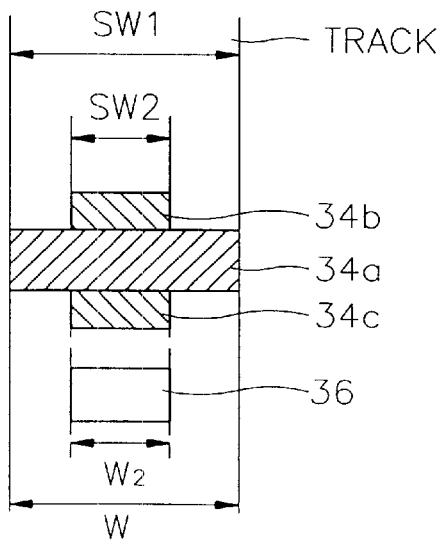

In the related art of FIGS. 2A and 2B, crisscross occurs between servo bursts A and B, but in the present invention as illustrated in FIGS. 3C, 4A, and 4B, crisscross occurs between servo patterns inside servo bursts A and B.

The burst signals A and B are disposed at the border of the track center line, and are disposed alternately on both sides in the traveling direction of the head. When the head is positioned accurately on the track center line, half the burst signal A is read by the head and then half the burst signal B is read by the head. As the head deviates from the track, the magnitude of one burst signal decreases and that of the other burst signal increases. The position error signal is obtained by the difference between the magnitudes of the burst signals read by the head.

FIG. 2A shows a servo burst signal recorded on a recording medium. Referring to FIG. 2A, the burst signal A 20 and the burst signal B 22 are recorded on a servo track. The burst signal A 20 and the burst signal B 22 are disposed alternately on both sides based on the center line of the track.

When the head is positioned accurately on the track, the magnitude of the burst signal A detected by the head 26 is the same as that of the burst signal B. Such a relationship is no longer maintained if the head deviates from the center line of the track. The magnitude of the burst signal is proportional to the area that the head scans. Thus, if the head deviates from the center of the track, the magnitude of the burst signal recorded on the corresponding track decreases and the magnitude of the burst signal recorded on the next track increases. If the head deviates from the track center line to the right on odd-numbered tracks n+1, n+3 and so on, the magnitude of the burst signal A detected by the head becomes large and that of the burst signal B becomes small.

Thus, a position error signal indicating the degree of deviation of the head can be obtained using the obtained difference between the magnitudes of the burst signals A and B detected by the head.

FIG. 2B shows the position of the head and the magnitude of the burst signal detected by the head in the recording medium shown in FIG. 2A. When the head passes over the servo a burst signal A or B, a magnitude signal corresponding to the degree of the overlapping of the head and the burst signal is generated. The magnitude signal with respect to the burst signal A is shown as a solid line and that with respect to the burst signal B is shown as a dotted line. The two graphs are similar to each other, having a difference of 180° in phase.

A portion where the magnitude of the burst signal is constant exists in the graph shown in FIG. 2B. That is, although the head deviates from the center of the track to a certain degree, there is an area where the magnitude signal does not vary according to the deviation of the head. This occurs because the width of the head is smaller than that of the servo burst signal.

As is well-known, the servo burst signal is recorded by the recording element 10 during a servo writing operation. The width W1 of the recording element 10 is basically equal to that of the track. However, the width of the MR sensor 20c is smaller than the width W1 of the recording element 10 or the width W of the track in the integrated head shown in FIG. 1. Thus, the occurrence of the dead zone cannot be avoided in the recording medium having the servo burst signal shown in FIG. 2A. As a result, the accuracy of a tracking control is lowered.

A preferred embodiment of the present invention will be described with reference to the accompanying drawings.

A servo burst signal recorded using a servo burst signal recording method according to the present invention is recorded in at least two regions divided in the traveling direction of the head, in which one region has the same width as that of a track, and the other region has a smaller width than that of the track. That is, the servo burst signal is recorded so that the area of the servo burst signal is linearly reduced as the head deviates from the center of the track. Accordingly, a servo performance of the hard disk drive is enhanced, which will be described below with reference to a recording medium according to the present invention.

FIGS. 3A through 3C show examples of the servo burst signals recorded on a recording medium according to the present invention. The servo burst signals shown in FIGS. 3A and 3B are recorded having a step from the center toward the edge. The servo burst signals have a first region 30a or 32a and a second region 30b or 32b, respectively. The width SW1 of the first region 30a or 32a is the same as the width W of the track. The width SW2 of the second region 30b or 32b is basically smaller than the width W of the track, and is equal to or smaller than the width W2 of the reading element 36.

FIG. 3C shows a different example of the servo burst signal recorded on the recording medium according to the present invention. The servo burst signal has a first region 34a, a second region 34b and a third region 34c. The width SW1 of the first region 34a is the same as the width W of the track, and the widths SW2 and SW3 of the second region 34b and the third region 34c are basically smaller than the width W of the track, and are equal to or smaller than the width W2 of the reading element 36.

To record the servo burst signal on the recording medium, a recording head moves by ¼ track pitch during a servo writing operation.

FIGS. 4A and 4B respectively show the position of the head and the magnitude of the burst signal in the recording medium having the servo burst signal shown in FIG. 3C.

When the head passes over the servo burst signal A or B, a magnitude signal corresponding to the degree of the overlapping of the head and the burst signal is generated. The magnitude signal with respect to the burst signal A is shown as a solid line and that with respect to the burst signal B is shown as a dotted line. The two graphs are similar to each other, except that there is a 180° difference in phase therebetween.

On the graphs, the maximum point of the magnitude signal is generated when the head is positioned at the center of the track, while the minimum point is generated when the head is positioned between the tracks. The solid line connects the maximum point with the minimum point.

It can be seen from the graph shown in FIG. 4B that there is no dead zone compared to that shown FIG. 2B. This occurs because the area of the servo burst signal covered by the head is changed due to the shape of the changed servo burst signal. Thus, the accuracy of the tracking control is enhanced because the head can accurately detect the degree that the head deviates from the center of the track, using the difference between the magnitude signals.

As described above, the servo burst signal recorded by the servo burst signal recording method according to the present invention enables the user to obtain a servo burst signal component without having a dead zone even in the case when the width of the reading head is smaller than that of the recording head, which provides an effect of enhancing a hard disk drive servo performance.

The disk recording medium according to the present invention enables the user to obtain a servo burst signal component without having a dead zone even in the case when the width of the reading head is smaller than that of the recording head, which provides an effect of enhancing the accuracy of the tracking control.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of enhancing the accuracy of positioning a read head in a center of a track of a disk recording medium, a write head having a width equal to that of the width of the track, comprising the steps of:

writing a pair of servo burst signals, one of said servo burst signals being centered on one edge of said track and the other of said servo burst signals being centered on an edge opposite to said one edge of said track, each servo burst signal having a shape of a cross, said servo burst signals having a first section centered on at a border between two adjacent tracks having a width less than a track width, a second section having a width equal to the width of a track and centered at said border between two adjacent tracks, a third section centered at said border between two adjacent tracks having a width less than a track width, said first section being adjacent to a first side of said second section and said third section being adjacent to a second side of said second section, said second side of said second section being opposite to said first side of said second section;

reading said pair of servo burst signals using said read head;

determining uniquely a position of said read head with respect to a center of said track by examining a magnitude of a first of said pair of servo burst signals and a magnitude of a second of said pair of said servo burst signals; and repositioning said read head based on said position of said read head.

2. The method of claim 1, wherein said read head is repositioned at said center of said track wherein magnitudes of both servo burst signals are equal to each other.

3. The method of claim 1, wherein magnitudes of both of said pair of servo burst signals vary linearly when said read head has a width equal to one-half of said width of said track and a center of said read head is originally located within one-half of said track width from said center of said track.

4. The method of claim 3, wherein said read head can be accurately and precisely repositioned on said center of said track if said center of said read head is originally displaced up to one track width from said center of said track width.

5. A method for repositioning a narrow read head accurately on a center of a track of a disk recording medium, comprising the steps of:

writing a pair of servo burst signals on either side of said track by a write head equal to a width of said track;

s reading magnitudes of each one of said pair of servo burst signals by a read head having a width of one-half of said width of said track;

determining, uniquely, accurately and precisely, a center of said read head with respect to a center of said track based solely on said magnitudes of said two servo burst signals provided said center of said read head is within one track width from said center of said track; and repositioning said read head so that said center of said read head is located directly above said center of said track based solely on said magnitudes of each one of said pair of servo burst signals.

6. The method of claim 5, wherein each of said pair of servo burst signals is in a shape of a cross.

7. The method of claim 5, wherein the magnitude of each servo burst signal read by said read head always varies linearly with a position of said read head with respect to said center of said track.

8. The method of claim 5, wherein each of said pair of servo burst signals being 'T'-shaped.

9. The method of claim 5, wherein each servo burst signal has a first portion that has a width equal to said width of said track and a second portion adjacent to said first portion that has a width less than said width of said track.

10. A method for repositioning a read head on a track of a disk recording medium, comprising the steps of:

writing, via a write head, a pair of servo burst signals on or near each track of said disk of recording medium;

reading, via a read head, magnitudes of each of said pair of servo burst signals to uniquely determine a position of said read head from a center of said track; and repositioning said read head so that a center of said read head is over said center of said track, wherein each servo burst signal has a first portion that has a width equal to a width of said track and a second portion adjacent to said first portion that has a width less than said width of said track.

11. The method of claim 10, wherein a central axis of said first portion of each servo burst signal is coextensive with a central axis of said second portion of said servo burst signal.

12. The method of claim 11, wherein each servo burst signal has a cross shape comprising two second portions and one first portion.

13. The method of claim 11, wherein each servo burst signal has a 'T'-shaped.

14. The method of claim 10, wherein each servo burst signal has the same shape.

\* \* \* \* \*